Figure 1:
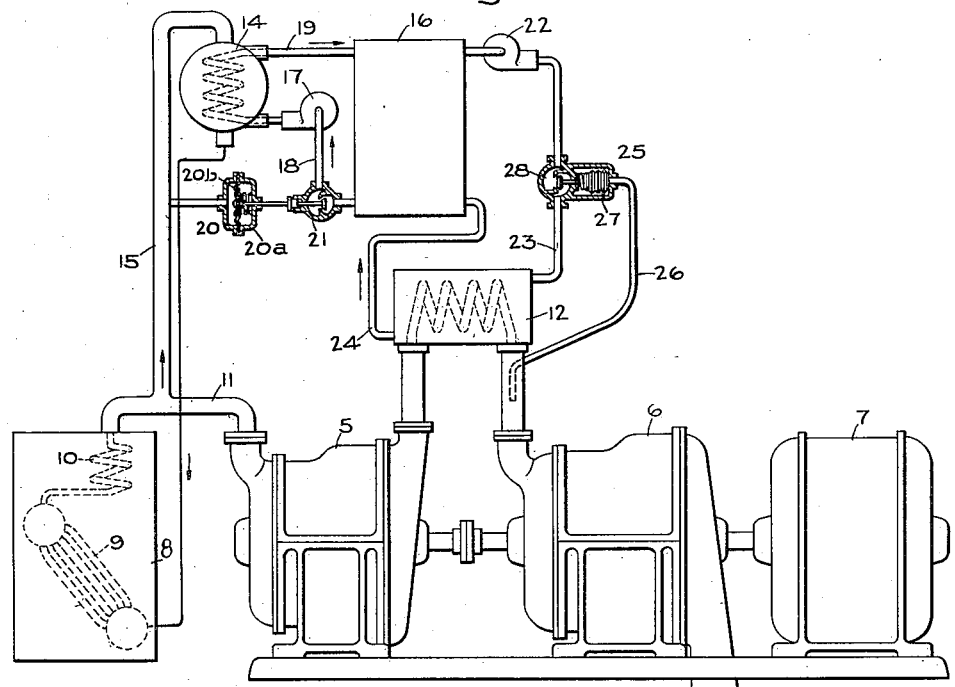

Aug. 14, 1934.  H. SCHULT  1,970,434

POWER PLANT WITH INTERMEDIATE SUPERHEATERS

Filed June 12, 1931

Inventor:
Heinrich Schult,
by Charles E. Tullar
His Attorney.

Patented Aug. 14, 1934

UNITED STATES PATENT OFFICE 1,970,434

POWER PLANT WITH INTERMEDIATE SUPERHEATERS

Heinrich Schult, Berlin-Schoneberg, Germany, assignor to General Electric Company, a corporation of New York Application June 12, 1931, Serial No. 543,943
In Germany July 10, 1930

8 Claims. (Cl. 60—73)

The present invention relates to power plants with intermediate superheaters and more particularly to power plants comprising elastic fluid engines in which the elastic fluid is superheated or reheated after having been passed through a part of such engines or units, such part being generally termed high pressure part in contrast to the low pressure part to which the intermediate-superheated elastic fluid is supplied.

The heat energy which is necessary for the intermediate superheating of the elastic fluid in such power plants has heretofore been directly transferred from the live elastic fluid line to the intermediate superheater. There are in general two methods in accordance with which the intermediate superheater has been operated, namely, the withdrawal of a part of the elastic fluid from the live elastic fluid line and passing this elastic fluid through the superheater whence it was returned to the elastic fluid generator, and the other method comprising the passing of the entire elastic fluid through the intermediate superheater and then supplying it from the outlet thereof to the high pressure part of the elastic fluid engine. In the event that the load of such plant is suddenly increased it is necessary to increase both the supply of elastic fluid to the engines as well as the supply of such fluid to the intermediate superheater. The elastic fluid generator of such plants accordingly has to be dimensioned with respect to the maximum or peak load of the elastic fluid engines as well as the intermediate superheater. On the other hand, in the event that a relatively heavy load is suddenly removed from the plant there is danger of overheating the superheaters because of the resulting reduction of the elastic fluid flowing therethrough and there is also the danger that the low pressure part of such engines may be unfavorably affected because of the abnormally high temperature of the elastic fluid supplied to such part by the superheater.

Thus it will be readily understood that the operation of intermediate superheaters involves certain difficulties and necessitates larger boiler units.

The object of my invention is to provide an improved arrangement for superheating or reheating elastic fluid.

For a consideration of what I believe to be novel and my invention, attention is directed to the following description and claims in connection with the drawing appended thereto.

Figure 2:
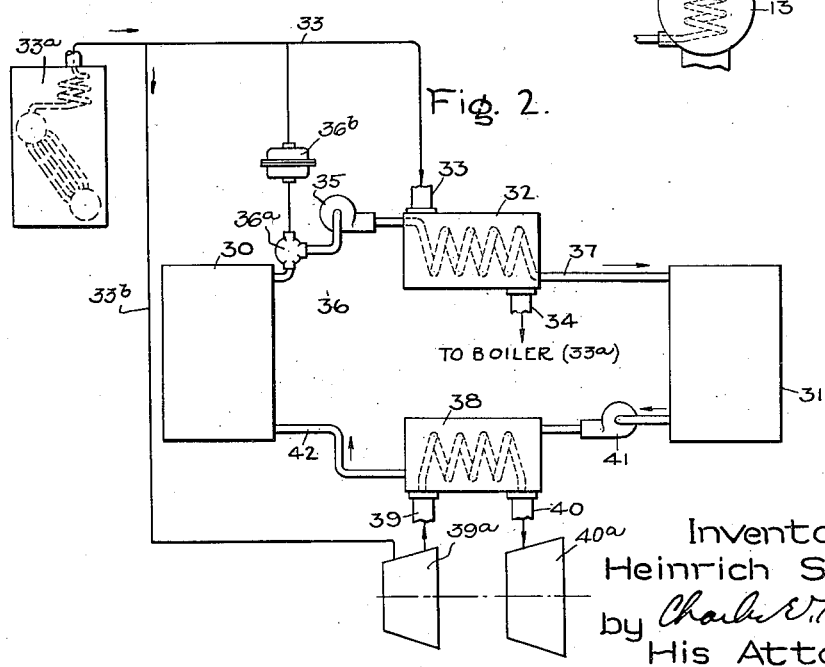

Referring to the drawing, Fig. 1 shows a diagrammatic view of a plant embodying my invention, and Fig. 2 illustrates diagrammatically a modification of a part of Fig. 1.

My invention comprises an indirect heat energy supply from the elastic fluid of the live elastic fluid line to the intermediate superheater and the accumulation of heat energy in a storage tank and furthermore, the control of heat energy supply to the storage tank in terms of load of the elastic fluid engines, particularly in such a manner that the supply of heat energy to the storage tank is increased when the load of the elastic fluid engines decreases. The heat energy supply from the storage tank to the intermediate superheater may be performed in terms of conditions of the elastic fluid supplied to the low pressure part of such elastic fluid engines.

Referring to the drawing, 5 and 6 represent the high pressure and low pressure parts respectively of an elastic fluid prime mover, in the present instance shown as a turbine, and forming two separate engines mechanically coupled with each other and driving an electric generator 7. The prime mover is supplied with a motive fluid from an elastic fluid generator 8 which comprises a boiler 9 and a superheater 10 through a high pressure supply conduit 11. The low pressure part 6 receives elastic fluid from the exhaust of the high pressure part through an intermediate superheater 12, in the present instance shown as an ordinary surface heat exchange apparatus. The exhaust steam of the low pressure part is supplied to a condenser 13.

The apparatus so far described may be taken as typical of any power plant with an intermediate superheater arrangement.

According to my invention, as shown in Fig. 1, I provide a heater 14 receiving elastic fluid through a conduit 15 from the high pressure conduit 11. Said elastic fluid may be returned to the boiler or other part of the plant by means indicated by single lines. The heater transfers the heat energy of the elastic fluid to a fluid, preferably a high boiling liquid contained in an accumulator 16; any suitable liquid having a high boiling point may be used in the tank 16 to permit the storing of a great amount of heat energy. Heater 14 therefore is in substance a heat exchanging means between the elastic fluid generator or boiler 9 and an accumulator or tank 16. For this purpose a circulation of the accumulator fluid through said heater is caused by the provision of means, in the present instance shown as a pump 17, which withdraws cold fluid from the lower part of the accumulator through a conduit 18 and forces said fluid through the heater 14, whence it is returned through a conduit 19 to the upper part of the accumulator.

It is desirable to regulate the amount of fluid circulating between the accumulator and the heater in response to the available heat energy in said heater, it being understood that this heat energy decreases if the load of the prime mover increases and vice versa. For this purpose I may provide a pressure responsive device 20 comprising a casing 20ª in which is located a diaphragm 20$^b$ which is subjected to the elastic fluid pressure in conduit 15 and which is adapted to control the position of a valve means 21. The operation of this device is as follows: If the turbine load decreases, pressure in lines 11 and 15 will increase. Thus the energy available in heater 14 will increase. The increased pressure in line 15 causes the pressure responsive device 20 to actuate valve means 21 in a manner such that the latter opens and allows a greater amount of fluid to be circulated between the accumulator and the heater.

In a similar manner circulation of fluid between the accumulator and the superheater is caused by the provision of a pump 22 withdrawing hot fluid from the upper part of the accumulator and forcing said fluid through a conduit 23 and the superheater, whence it is returned through a conduit 24 to the lower part of the accumulator.

It is desirable to effect the circulation of fluid between the accumulator and the intermediate superheater in response to conditions of the elastic fluid supplied to the low pressure part of the prime mover. Such regulation has been achieved in the present instance by the provision of a temperature responsive device 25 comprising a tube 26, one end of which being sealed and subjected to the temperature of the elastic fluid supplied to the low pressure part, the other end of said tube being connected to an otherwise closed bellows-like device 27. To the outer face or diaphragm of said bellows is securely fastened a stem of valve means 28 in order that the reciprocating motion of the bellows as it expands or contracts will be imparted to said valve. The space enclosed within tube 26 and bellows 27 is filled with a medium having a determined coefficient of expansion.

The operation of the temperature responsive apparatus is as follows: If the temperature of the elastic fluid supplied to the low pressure part increases, the medium within tube 26 and bellows 27 will expand and cause a corresponding expansion of the bellows which thereby effects a closing actuation of valve means 28, resulting in a decreased circulation of fluid between the accumulator 16 and the intermediate superheater 12. The decreased circulation of fluid necessarily causes less heat energy to be transferred from the fluid of the accumulator to the elastic fluid of the low pressure part of the prime mover.

Thus it will be clearly understood that the heat energy transferred from the elastic fluid in the live line to the superheater does not reach the latter directly but indirectly owing to the interposition of an accumulator or storage tank. In the present instance I have shown heater 14 as a surface heat exchanger so that no elastic fluid withdrawn from live line 11 comes into direct contact with the fluid in the accumulator. Such an arrangement is advantageous in case a liquid is used as a heat storage medium in the accumulator.

It will be readily understood that within a certain period of time there is no definite relation between the amount of heat energy transferred from the heater 14 to accumulator 16 and the amount of heat energy transferred from accumulator 16 to the intermediate superheater 12. This fact makes it possible to accumulate heat energy in tank 16 during periods of low load and to relatively decrease the heat energy supplied to said tank during periods of peak load. Thus it is possible to provide a smaller elastic fluid generator, since the size thereof is not determined by the maximum demand for fluid by the elastic fluid engines and the intermediate superheater, but by the maximum demand for fluid by the engines and the fluctuations of load of said engines. In cases where the plant is subjected to many fluctuations it may not be necessary to take into consideration the demand for elastic fluid by the intermediate superheater as the total amount of heat energy for said intermediate superheater can be accumulated during periods of low load. Thus it will be clearly understood that the method and arrangement according to my invention makes the operation of such plants more rational and consequently more economical.

I have shown in Fig. 1 the provision of a single tank 16 which contains cold fluid in its lower part and hot fluid in its upper part and in respect to which two circulation processes take place, one between said tank and heater, and the other between said tank and intermediate superheater.

I may also provide two tanks, one for the cold fluid and one for the hot fluid. Such an arrangement has been diagrammatically illustrated in Fig. 2, wherein 30 indicates a tank containing cold fluid, 31 indicates a tank containing hot fluid, 32 represents a heater corresponding to heater 14 of Fig. 1, said heater being supplied with elastic fluid from the live line through a conduit 33 connected to a boiler 33$^a$ and the elastic fluid being returned by means of conduit 34 to the boiler or the like. The heat energy of said live elastic fluid is transferred to the fluid in tank 31. For this purpose I provide a pump 35 having a conduit 36 to the cold fluid tank 30 and withdrawing fluid therefrom and forcing said fluid through heater 32, whence it is passed through a conduit 37 and accumulated in tank 31. Provided in conduit 36 is a valve means 36$^a$ controlled by a pressure responsive device 36$^b$ which is connected to live steam line 33. 38 represents an intermediate superheater corresponding to superheater 12 of Fig. 1, which is provided with conduits 39 and 40 to the low pressure and high pressure parts 39$^a$ and 40$^a$ respectively of an elastic fluid engine. The high pressure part of the elastic fluid engine receives actuating fluid from boiler 33$^a$ through a line 33$^b$. A pump 41 withdraws hot fluid from tank 31 and forces said fluid through superheater 38, whence it is passed through a conduit 42 to the cold fluid tank 30. The amount of fluid conveyed from the cold to the hot fluid tank and vice versa may be controlled by suitable means, such as pressure and temperature responsive means respectively, similar to those illustrated with regard to Fig. 1.

It will be noted that with the arrangement illustrated by Fig 2 there is one circulation process only. This circulation, however, comprises two parts or halves which are temporarily independent of each other, that is, the displacement of fluid in one direction does not necessitate the simultaneous displacement of fluid in the other direction.

Having now described the method of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In a power plant, the combination with an elastic fluid generator, an elastic fluid engine comprising a high pressure and a low pressure part and being supplied with elastic fluid from said generator, an intermediate superheater through which the elastic fluid is passed between said high pressure and low pressure parts, of an accumulator containing a fluid, a heater, means for supplying elastic fluid from the elastic fluid generator to said heater, a pump for supplying fluid from the lower part of said accumulator to said heater, means for controlling the actuation of said pump in response to the pressure of elastic fluid in said elastic fluid generator, a conduit for returning the fluid from said heater to the upper part of said accumulator, means for supplying fluid from said accumulator to said intermediate superheater, a temperature responsive means for controlling the supply of fluid from said accumulator to said intermediate superheater in terms of conditions of the elastic fluid supplied to the low pressure part of said elastic fluid engine and a conduit for returning the fluid from said intermediate superheater to the lower part of said accumulator.

2. In a power plant, the combination with an elastic fluid generator, an elastic fluid engine comprising a high pressure and a low pressure part and being supplied with elastic fluid from said generator, an intermediate superheater through which the elastic fluid is passed between said high pressure and low pressure parts, of an accumulator containing a fluid, a heater comprising a coiled conduit having its ends connected to the lower and upper part of said accumulator respectively, means for causing a circulation of fluid of the accumulator through said coiled conduit in response to conditions in the elastic fluid generator, means for transferring elastic fluid from said generator to said heater, means for causing a circulation of fluid between said accumulator and intermediate superheater, a temperature responsive device for controlling said last means in response to conditions of the elastic fluid in the low pressure part of the elastic fluid engine.

3. In a power plant, the combination with an elastic fluid generator, an elastic fluid engine comprising a high pressure and a low pressure part and being supplied with elastic fluid from said generator, and an intermediate superheater through which the elastic fluid is passed between said high pressure and low pressure parts, of an accumulator containing a fluid for storing heat energy, a heat exchanger receiving heating fluid from the generator, conduit means including a pump and a valve for circulating heat storing fluid between the accumulator and the heat exchanger, a pressure responsive device connected to the generator for controlling the valve in response to pressure changes in the generator, and means for circulating fluid between the accumulator and the superheater.

4. In a power plant, the combination with an elastic fluid generator, an elastic fluid engine comprising a high pressure and a low pressure part and being supplied with elastic fluid from said generator, and an intermediate superheater through which the elastic fluid is passed between said high pressure and low pressure parts, of an accumulator containing a liquid, heat exchanging means between the elastic fluid generator and the accumulator, conduit means including a pump and a valve for circulating liquid between the accumulator and the superheater, and a temperature responsive device for controlling the valve in terms of temperature changes in the low pressure part of the engine.

5. In a power plant, the combination with an elastic fluid generator, an elastic fluid engine comprising a high pressure and a low pressure part and being supplied with elastic fluid from said generator, and an intermediate superheater through which the elastic fluid is passed between said high pressure and low pressure parts, of an accumulator containing a liquid, a heat exchanger receiving heating fluid from the elastic fluid generator, conduit means including a pump and a valve for circulating liquid between the accumulator and the heat exchanger, a pressure responsive device for controlling the valve in response to pressure changes in the generator, other conduit means including a pump and a second valve for circulating liquid between the accumulator and the intermediate superheater, and a temperature responsive device for controlling the second valve in terms of temperature changes in the low pressure part of said engine.

6. In a power plant, the combination with an elastic fluid generator, an engine receiving elastic fluid from the generator, and a reheater connected to the exhaust of the engine, of a tank containing a liquid having a high boiling point, a heat exchanger receiving heating fluid from the generator, conduit means including a pump and a valve for circulating liquid between the tank and the heat exchanger, a pressure responsive device for controlling the valve in response to pressure changes in the generator, and means for circulating liquid between the tank and the reheater.

7. In a power plant, the combination with an elastic fluid generator, an elastic fluid engine receiving elastic fluid from the generator, of means for reheating the exhaust fluid of the engine comprising a tank containing a fluid, a surface heat exchanger connected between the tank and the generator, means for circulating fluid between the heat exchanger and the tank to transfer heat energy from the generator to the fluid in the tank, a surface heat exchanger between the tank and the exhaust conduit of the engine, means for circulating fluid between the tank and the surface heat exchanger to transfer heat energy from the fluid in the tank to the exhaust elastic fluid of the engine, the tank and the heat exchangers connected thereto forming a closed system with the fluid contained in the tank independent from the fluid in the generator.

8. In a power plant, the combination with an elastic fluid generator, an elastic fluid engine receiving elastic fluid from the generator, of means for reheating the exhaust fluid of the engine comprising a tank containing a fluid, means including a surface heat exchanger connected between the tank and the generator for circulating fluid between the surface heat exchanger and the tank to transfer heat energy from the generator to the fluid in the tank in response to pressure conditions in the generator, a surface heat exchanger between the tank and the exhaust conduit of the engine, means for circulating fluid between the last named surface heat exchanger and the tank to transfer heat energy from the fluid in the tank to the exhaust elastic fluid of the engine, and means for controlling the transfer of heat energy.

HEINRICH SCHULT.